Jan. 27, 1970  B. W. LARSEN ET AL  3,491,939

VERTICAL CRANKSHAFT FOR A MOTOR COMPRESSOR

Filed May 7, 1968  2 Sheets-Sheet 1

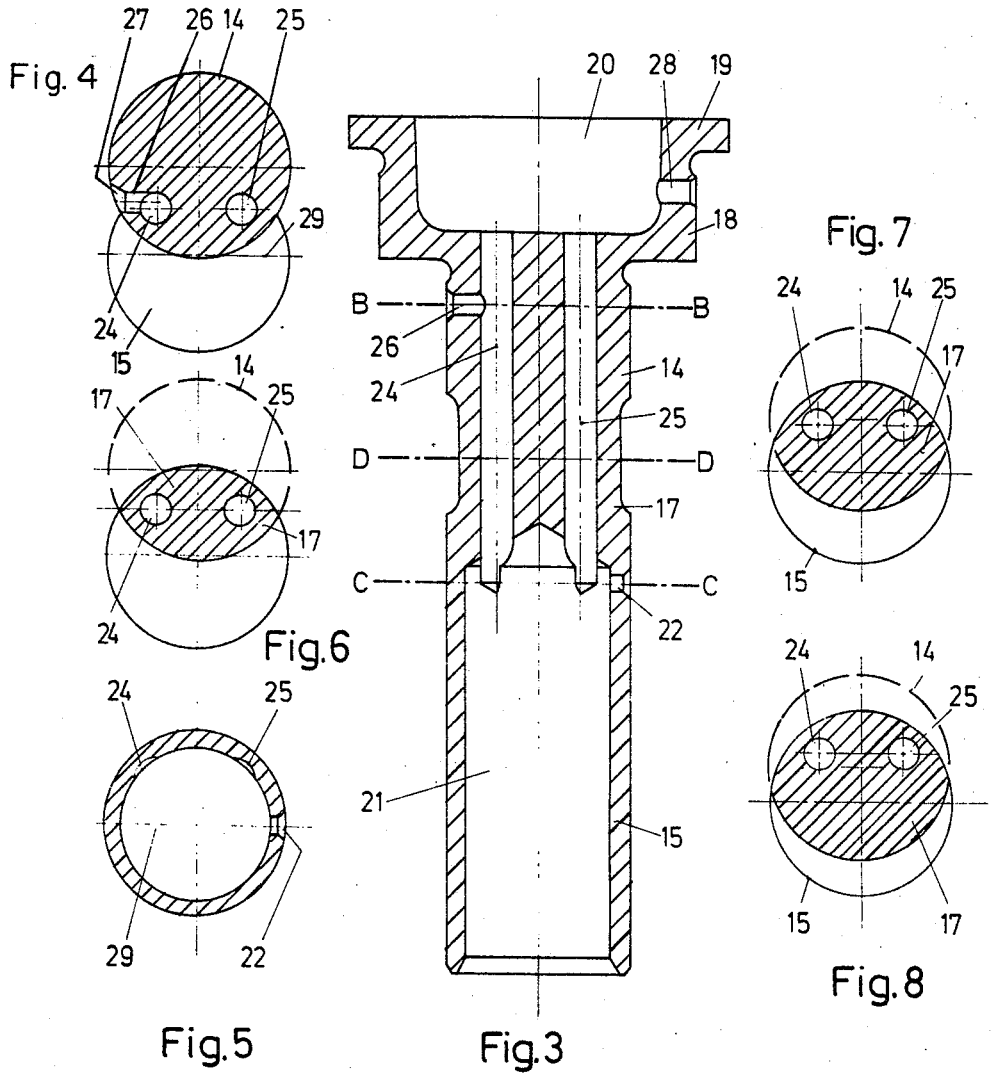

United States Patent Office 3,491,939
Patented Jan. 27, 1970

3,491,939
VERTICAL CRANKSHAFT FOR A MOTOR COMPRESSOR
Bendt Wegge Larsen, Augustenborg, Knud V. Valbjorn, Nordborg, and Bent Melchior Karlsen Holme, Humbaek, pr. Skovby, Denmark, assignors to Danfoss Z/S, Nordborg, Denmark, a company of Denmark
Filed May 7, 1968, Ser. No. 727,225
Int. Cl. F01m 1/06; F04b 35/04
U.S. Cl. 230—206       1 Claim

ABSTRACT OF THE DISCLOSURE

The invention relates generally to a motor compressor assembly of the type utilized for small refrigeration machines and particularly to a lubrication arrangement for such an assembly in which lubrication passages are provided in the crankshaft thereof for providing lubrication to the upper and lower crankshaft bearings and the crank bearing.

---

Figure 1:
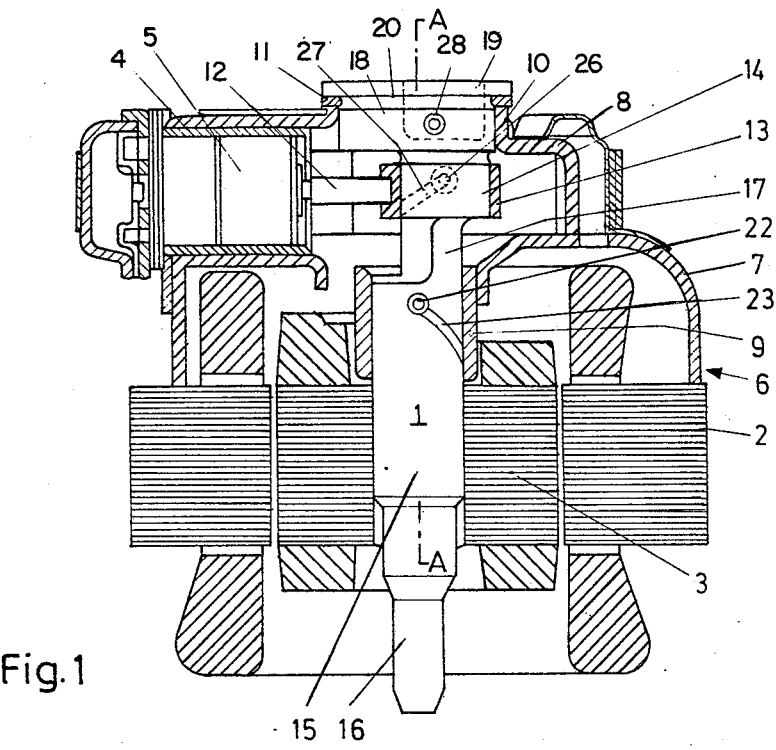

This invention relates to a vertical crankshaft for a motor compressor, particularly for an encapsulated refrigerating machine, said crankshaft having a lower and an upper shaft bearing and a crank bearing disposed therebetween, the shaft containing an oil-feed cavity below the crank, from which cavity oil-outlet orifices near the crank bearing and the upper shaft bearing are supplied with oil by way of a passage passing through the crank.

It has been found that when motor compressors of this kind start up and when the oil is still relatively cold, only the lower of the two oil-outlet orifices, namely that of the crank bearing, receives sufficient oil, whereas adequate supply of oil via this point, i.e. as far as the oil-outlet orifice of the upper shaft bearing, only takes place some time later. The motor compressor can, however, suffer as a result of this inadequate lubrication. Although attempts can be made to pass oil to the upper shaft bearing at an earlier moment by increasing the cross-section of the passage, the success achieved is, however, only minimal. Furthermore, at the zone of transition from shaft to crank, the crankshaft is subjected to high stresses, so that the cross-section at this point may not be weakened in a random manner.

The object of the invention is to provide a vertical crankshaft for a motor compressor of the above-described kind, wherein the upper crank bearing is also properly lubricated immediately the oil feed begins, without the strength characteristics of the shaft being adversely affected.

According to the invention, this object is achieved by means of two passages leading respectively to one of the two oil-outlet orifices near the crank bearing and the upper shaft bearing.

Since each oil-outlet orifice is associated with its own passage, one orifice is not supplied with oil in preference to the other. Furthermore, the necessary cross-section of the one passage can be divided into two passages of smaller cross-section which can thus take the form of holes of smaller diameter. The result of this is that the moment of inertia, which is a decisive factor as regards bending stress, can be considerably reduced.

In a further form of the invention, the two passages have a clear opening near the upper shaft bearing. The excess oil can therefore, as before, emerge at the top and can be flung outwards against the wall of the casing for cooling purposes.

The two passages preferably open into a recess in the end face, from which recess the oil-outlet orifice of the upper shaft bearing runs. The oil collecting in the recess can flow freely into said oil-outlet orifice.

In the case of a shaft having centrifugal lubrication and a cavity extending upwards into the shaft, it is of advantage if the two passages are disposed at the edge of the cavity. Due to their being positioned at the edge, the passages can be completely filled with the oil passed up by the centrifugal force. The edge position can be particularly easily achieved, since, because of their small cross-section, the position of the passages can be selected much more freely than the position of the single passage previously employed.

Preferably, the distance between the passages is greater than their diameter. The area left between them therefore forms a web which strengthens the shaft against the forces that arise.

In a preferred embodiment, the cavity extends to a point near the lower shaft bearing and the oil outlet orifice for the lower shaft bearing runs directly from the cavity. In this way, all three lubrication points (lower shaft bearing, upper shaft bearing and crank bearing) are arranged in parallel, so to speak, and are supplied with sufficient oil from the outset.

It is also expedient for the outlet orifices to open into the upper zone of each bearing and for the bearing surfaces possibly to be provided with grooves which pass the lubricant downwards. In this way, the various bearings are treated by a considerably greater quantity of oil than in the known construction where the outlet orifices open into the lower zone of the bearing and grooves which pass the lubricant upwards are provided. However, the greater the amount of oil used up in the crank bearing, the greater is the danger that the upper shaft bearing will receive oil too late upon starting up. If however, as provided for by the invention, the various bearings are separately supplied with oil, this danger is no longer present.

Figure 2:
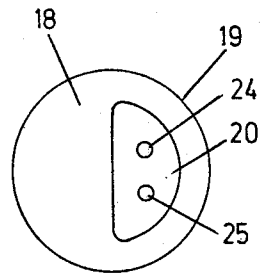

The invention will now be described in greater detail by reference to an embodiment illustrated in the drawing, wherein:

FIG. 1 shows a longitudinal section through a motor compressor incorporating the crankshaft in accordance with the invention, FIG. 2 is a plan view of the crankshaft, FIG. 3 is a longitudinal section through the shaft on line A—A of FIG. 1, FIG. 4 is a cross-section on the line B—B of FIG. 3, FIG. 5 is a cross-section on the line C—C of FIG. 3, and FIGS. 6 to 8 are cross-sections on the line D—D of FIG. 3, showing various eccentric positions of the shaft.

The motor compressor has a vertical motor crankshaft 1 with the motor positioned underneath, this motor consisting of a stator 2 and a rotor 3; the system also comprises a compressor located at the top and consisting of a cylinder 4 and a piston 5. A supporting element 6 having a lower sheet-metal part 7 and an upper sheet-metal part 8 soldered thereto, connects the stator 2 with the cylinder 4. The supporting element 6 also carries a lower shaft bearing 9 and, together with an extension, forms an upper shaft bearing 10. The end-face of the latter is provided with a ring 11 of bearing metal. The piston 5 is flexibly connected to a connecting rod 12 which is driven, through a crank bearing ring 13, by the crank 14 of the shaft 1.

The shaft 1 consists of a lower cylindrical portion 15, and joined to the lower end thereof is an oil-feed device 16 comprising a hollow cone of known kind. The portion 15 is connected with the crank 14 by way of an intermediate portion 17. The intermediate portion 17 lies within the cylindrical curves enclosing the crank 14 and the shaft portion 15. It is of somewhat greater length than the crank bearing ring 13. Adjoining the crank 14 is an upper shaft journal 18 which terminates in a flange 19. The shaft journal 18 is mounted in the shaftbearing 10. The underside of the flange 19 rests on the bearing ring 11 of the pressure bearing. The shaft journal 18 contains a recess 20, the shape of which can be seen from FIG. 2, so that it also forms a counterweight to the crank journal 14.

Further details of the compressor, such as valves, cylinder head, noise-reducing compartment casing etc., are only roughly indicated or not illustrated at all, since they are not necessary for understanding the invention.

The shaft 1 contains a cylindrical bore 21 which extends upwardly from the lower end-face as far as the region of the lower shaft bearing 9, and close to its upper end the shaft 1 contains an oil-outlet orifice 22 for the lower shaft bearing 9. Connected to this, on the outside, is a groove 23 which passes the oil downwards. Two vertical passages 24 and 25 extend upwards from the outer edge of the cavity 21 to the recess 20. At the upper end of the crank bearing there branches from the passage 24 an oil-outlet orifice 26 to which is connected, on the outside, a spiral groove 27 giving a downwards feed. The other passage 24 leads directly into the recess 20 from which an oil-outlet orifice 28 extends outwardly in the region of the upper shaft bearing 10.

As can be seen from FIGS. 4 and 5, the plane passing through the axes of the passages 24 and 25 is offset parallel with the central plane 29 of the concentric portions 15 and 18 of the shaft. This offset results, on the one hand, from the fact that the passages must run through the projection of the crank 14 on to the portion 15, represented in the present embodiment by the intermediate portion 15. On the other hand, the passages should begin at the edge of the bore 21 and there should be a distance between them that exceeds their own diameters. Because of these requirements, there result the cross-sections, illustrated in FIGS. 6–8, at the level of the line D—D, FIG. 6 showing an example with a crank journal of very great eccentricity, FIG. 7 an example where the crank journal is of medium eccentricity, and FIG. 8 an arrangement wherein the eccentricity of the crank journal is small.

Between the passages 24 and 25 there remains a web of considerable width, which increases the rigidity of the crankshaft. Also, the passages have a smaller diameter, so that in the extreme case illustrated in FIG. 6, a greater moment of inertia with respect to the bending stress results than in the case of a single passage of equal cross-section, and therefore of greater diameter.

In the embodiment illustrated, the crankshaft has an intermediate portion 17 which is intended to enable the shaft to be introduced from above into the three non-split bearings 10, 13 and 9. The idea of the invention can, however, also be applied to crankshafts having no such intermediate portion. Nor is it necessary for the upper portion 18 of the shaft to be of greater diameter than the lower portion 15.

We claim:

1. A motor-compressor assembly comprising a housing defining a cylinder, bearing means fixedly associated with said housing forming upper and lower axially aligned and axially spaced radial thrust bearings, a shaft having upper and lower journal portions journalled in said bearings and an intermediate crank portion, movable bearing means for said crank portion, said shaft having a cylindrically shaped oil feed cavity below said crank portion, said shaft having at least two vertical oil passages intersecting the circumference of said cavity and extending upwardly therefrom, said shaft having a transversely extending oil passage connected to one of said vertical oil passages and having fluid communication through said crank portion with said movable bearing, a transversely extending passage extending from said cavity and having fluid communication with said lower bearing, said shaft having a recess at the upper end thereof, said vertical passages having respective ports opening into said recess, and oil passage means between said recess and said upper bearing for supplying oil to said upper bearing.

References Cited

UNITED STATES PATENTS

| | | | |
|---|---|---|---|
| 2,274,943 | 3/1942 | Touborg | 230—206 |
| 2,809,872 | 10/1957 | Warner | 230—206 XR |

ROBERT M. WALKER, Primary Examiner